A. BUJAC.
DEVICE FOR PREVENTING PIPES FROM BURSTING.

No. 186,305. Patented Jan. 16, 1877.

WITNESSES

INVENTOR
Alfred Bujac.
Alexander+mason.
ATTORNEYS.

UNITED STATES PATENT OFFICE.

ALFRED BUJAC, OF WASHINGTON, DISTRICT OF COLUMBIA.

IMPROVEMENT IN DEVICES FOR PREVENTING PIPES FROM BURSTING.

Specification forming part of Letters Patent No. 186,305, dated January 16, 1877; application filed January 8, 1877.

*To all whom it may concern:*

Be it known that I, ALFRED BUJAC, of Washington, in the county of Washington and in the District of Columbia, have invented certain new and useful Improvements in Devices for Preventing Pipes from Bursting; and do hereby declare that the following is a full, clear, and exact description thereof, reference being had to the accompanying drawings, and to the letters of reference marked thereon, making a part of this specification.

The object of my invention is to prevent pipes from bursting when the water or fluid therein freezes; and the nature of my invention consists in providing such pipe with an interior hose made of india-rubber or vulcanized rubber, or any elastic substance capable of yielding to the pressure due to the expansion of water in the formation of ice, and returning it to its original size when relieved of said pressure, as will be hereinafter more fully set forth.

In order to enable others skilled in the art to which my invention appertains to make and use the same, I will now proceed to describe its construction and operation, referring to the annexed drawing, in which—

Figure 1:
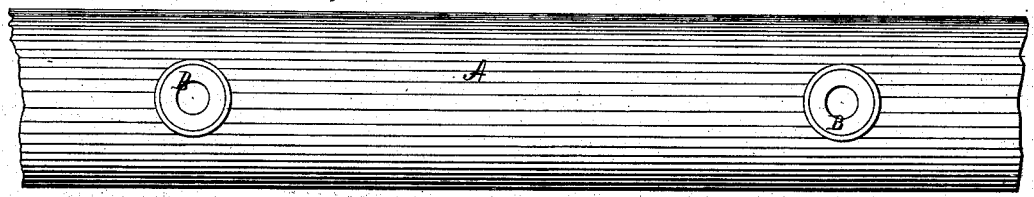
Figure 2:
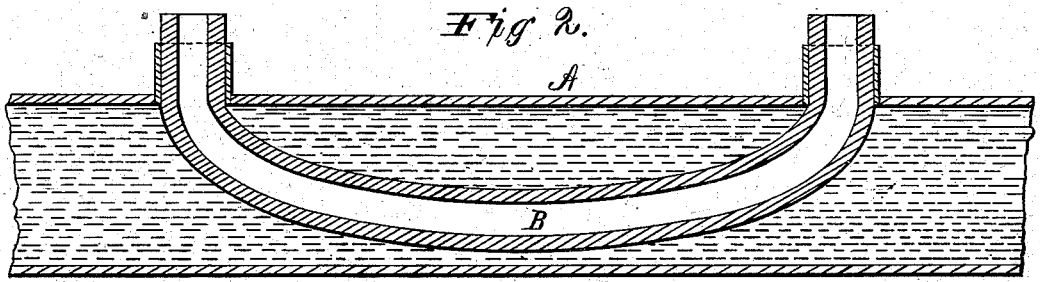
Figure 3:
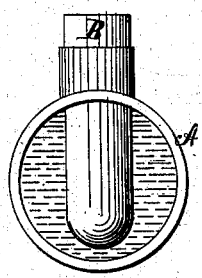

Figure 1 is a side view of a water-pipe embodying my invention. Fig. 2 is a longitudinal section, and Fig. 3 a cross-section, of the same.

A represents a section of a water-pipe, within which is placed a hose, B, of rubber or other elastic material. This hose may be of any suitable dimensions, and has its ends passed through the side of the pipe A and fastened water-tight thereto by any suitable or convenient means. The hose B takes up a certain amount of the room within the pipe A, so that said pipe is not exclusively filled with water. When the water in the pipe A freezes it expands; and if both ends of the said pipe were closed, the pipe would necessarily burst; but the elastic hose B takes up the expansion of the water in freezing; or, in other words, contracts in the same proportion as the water expands, and there will be no more pressure on the pipe than there was before. When the ice thaws again the hose expands to its original size. In very small pipes an elastic cord of suitable thickness may be used instead of the hose.

Having thus fully described my invention, what I claim as new, and desire to secure by Letters Patent, is—

In combination with a water-pipe, A, having two openings in its side, a rubber tube, B, with both of its ends passed through said openings and fastened water-tight, substantially as and for the purposes set forth.

In testimony that I claim the foregoing I have hereunto set my hand this 29th day of December, 1876.

ALFRED BUJAC.

Witnesses:
J. M. MASON,
FRANK GALT.